United States Patent [19]

Takei et al.

[11] Patent Number: 4,802,003

[45] Date of Patent: Jan. 31, 1989

[54] COLOR PICTURE INFORMATION TRANSMISSION SYSTEM

[75] Inventors: Masahiro Takei; Tadashi Takayama, both of Kanagawa, Japan

[73] Assignee: Canon Kabushiki Kaisha, Tokyo, Japan

[21] Appl. No.: 18,709

[22] Filed: Feb. 25, 1987

[30] Foreign Application Priority Data

Feb. 28, 1986 [JP] Japan .............................. 61-044559
Feb. 28, 1986 [JP] Japan .............................. 61-044561
Feb. 28, 1986 [JP] Japan .............................. 61-044562

[51] Int. Cl.[4] .................. H04N 7/12; H04N 7/04; H04N 11/06; H04N 11/08
[52] U.S. Cl. .................................. 358/133; 358/12; 358/13; 358/141
[58] Field of Search ............... 358/12, 133, 137, 141, 358/135, 13

[56] References Cited

U.S. PATENT DOCUMENTS

| | | | |
|---|---|---|---|
| 4,023,199 | 5/1977 | Netravali et al. | 358/13 |
| 4,054,909 | 10/1977 | Kojima et al. | 358/13 |
| 4,125,856 | 11/1978 | Netravali et al. | 358/13 |
| 4,141,034 | 2/1979 | Netravali et al. | 358/13 |
| 4,352,122 | 9/1982 | Reitmeier et al. | 358/13 |
| 4,503,454 | 3/1985 | Lewis, Jr. | 358/13 |
| 4,583,113 | 4/1986 | Pritchard | 358/12 |

Primary Examiner—James J. Groody
Assistant Examiner—John K. Peng
Attorney, Agent, or Firm—Robin, Blecker & Daley

[57] ABSTRACT

The color picture information transmission system according to the invention is a system for transmitting a color picture information signal, wherein a color component information signal is created from the inputted color picture information signal, a plurality of transmission signals are formed according to a plurality of transmission modes varying in information transmission density each other by means of the color component information signal created as above, the color component information signal is divided into a plurality of groups, a transition according to the plurality of transmission modes is detected with reference to each color component information signal group, a transmission mode in each group is selected from among the plurality of transmission modes according to the detection result, a transmission signal of the plurality of transmission signals formed as above which is formed according to one kind of transmission mode based on the selection result is generated to transmission.

44 Claims, 10 Drawing Sheets

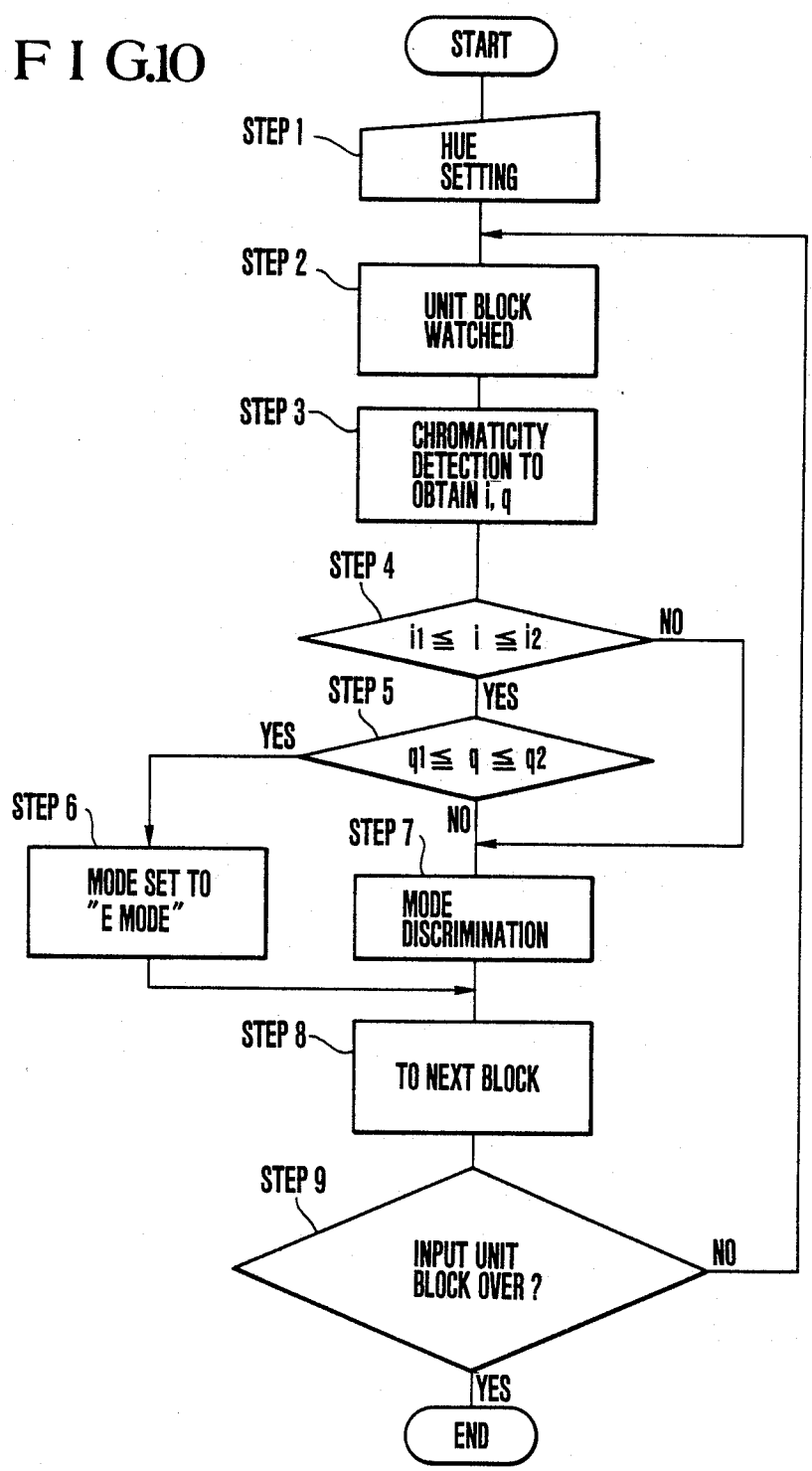
F I G.10

COLOR PICTURE INFORMATION TRANSMISSION SYSTEM

BACKGROUND OF THE INVENTION

1. Field of the Invention

The present invention relates to a color picture information transmission system.

2. Description of the Prior Art

For transmitting a picture information such as video signals, for example, a variable density sampling system has been proposed wherein a sampling frequency is varied adaptively according to a frequency of the video signal for transmission. FIG. 1 is a pattern drawing of a principle of the variable density sampling system.

In FIG. 1, first an original video signal waveform is sampled according to a sampling frequency fsp, divided at every predetermined sampling point number (4 sampling points, for example) as indicated by a term T in the drawing, and then whether the original video signal waveform is sparse or dense is discriminated at every divided blocks. Then, in the block decided to be dense, all data obtained through sampling the original video signal is transmitted as transmission data, but in the block decided to be sparse, only a part of all data is transmitted as transmission data, and the remaining data is held as thinned-out data and hence is not transmitted. In the drawing, that with a mark C is a data to be transmitted (transmission data), and that with a mark x is a data not transmitted (thinned-out data).

The number of data to be transmitted per unit time will be decreased and a transmission band of the transmission video signal will be compressed by transmitting the data indicated by the mark O at constant intervals.

The thinned-out data having not been transmitted is restored approximately by means of the transmitted data, thus obtaining an interpolation data (with a mark ● in the drawing). Then, the interpolation data corresponds to a portion sparse in the original video signal waveform and is restored as a data extremely approximate to the thinned-out data, therefore substantial information content does not change as compared with the case where all data are transmitted, and thus a transmission band of the video signal may be sharply compressed.

In this case, all data are transmitted in each group, however, whether or not a part of data is transmitted will be decided upon investigating of the density of the original video signal waveform, and the decision information is transmitted as a transmission mode information signal at the same time.

FIG. 2 is a block diagram for realizing the aforementioned transmission system.

A video signal (or NTSC signal, for example) inputted from an input terminal is digitized by an analog-to-digital (A/D) converter 2. The sampling frequency fsp in this case is specified to be double or more of a maximum frequency component of the input video signal. An output signal of the A/D converter 2 is fed to a decoder 3 and separated into a luminance signal Y and two kinds of chrominance signals I and Q. The luminance signal Y is fed to a mode discriminating circuit 16 and also introduced to a matrix circuit 4, and the signals I, Q are fed to the matrix circuit 4 likewise. In the matrix circuit 4, three-primary color signals R, G, B are obtained through arithmetic operation according to each of the inputted signals Y, I, Q.

A relation between the signals R, G, B and the signals Y, I, Q stands as follows:

$$Y = 0.30R + 0.5G + 0.11B$$

$$I = 0.74(R - Y) - 0.27(B - Y)$$

$$Q = 0.48(R - Y) + 0.41(R - Y)$$

The three-primary color signals R, G, B obtained from the matrix circuit 4 are loaded in R-, G-, B-memories 10, 11, 12 of a first memory group respectively as signals having a ½ fsp band by the matrix circuit 4 and also fed to a prefilter 6. For example, in the case of unidimensional variable density sampling in one block construction of the four sampling points like FIG. 1, the band is limited further to a quarter of ½ fsp through the prefilter 6. An output of the prefilter 6 has information of the three sampling points other than one sampling point inputted first of information of the four sampling points removed by a thinning-out circuit 5. The three-primary color signals having the band compressed to a quarter as above are loaded in R-, G-, B-memories 7, 8, 9 of a second memory group.

Outputs of the first and second memory groups are led to three input terminals of switch circuits 13 and 14, and further outputs of the switch circuits 13 and 14 are led to input terminals E, C of a switch circuit 15. An operation of the mode discriminating circuit 16 will be described according to FIG. 3 and FIGS. 4(a) to 4(d).

FIG. 4(a) represents a luminance signal row sampled by the sampling frequency fsp. A luminance signal at time $t_n$ is indicated by $y_n$, a luminance signal at time $t_{n+1}$ is indicated by $y_{n+1}$, then $y_{n+2}$, $y_{n+3}$ and so on. Now, let it be assumed that $y_n$ to $y_{n+3}$ constitute one unit block.

The luminance signal $y_n$ led to the mode discriminating circuit 16 is latched in a latch circuit 20 at the leading edge ($t_n$) of a clock 1 shown in FIG. 4(b). An output of the latch circuit 20 is led to a latch circuit 21 and an interpolation circuit 22. The output of the latch circuit 20 is latched at a leading edge ($t_{n+4}$) of the next pulse of the clock 1 by the latch circuit 21. As in the case of the thinning-out circuit 5, the luminance signals $y_n$, $y_{n+4}$ of the sampling point inputted first of the luminance signal unit block are latched on the latch circuits 20 and 21. Then, each output is led to the interpolation circuit 22.

The interpolation circuit 22 computes and outputs interpolation luminance signals $y_n$ to $y_{n+3}$ at times $t_n$ to $t_{n+3}$ from two inputs $y_n$, $y_{n+4}$ through a primary interpolation as shown, for example, in a broken line of FIG. 4(d).

On the other hand, the luminance signal $y_n$ is also inputted to a shift register 23 and shifted by leading edges ($t_n$, $t_{n+1}$, $t_{n+2}$, . . . ) of the clock 2 shown in FIG. 4(c). As described, the luminance signal row led to the mode discriminating circuit 16 is output by the interpolation circuit 22 and the shift register 23 at the time $t_{n+4}$ as shown in FIG. 3.

Each output works as an input to a subtractor 24, and the differential is led to an adder 26 by way of an absolute value circuit 25. An output of the adder 26 works as one input to a comparator 27 and is compared with a threshold value Yth preset on the other input.

As described above, in the mode discriminating circuit 1, a level of the luminance signal or a difference in power between information of the original sampling points constituting a block unit and information of the sampling points by interpolation is detected, and if the sum exceeds a threshold value, a transmission mode of the block is decided to be a mode (hereinafter called "E mode") for transmitting information of all the sampling points, but if it comes below the threshold value, then the transmission mode is decided to be a mode (hereinafter called "C mode") for transmitting information of the thinned-out sampling points, and thus a mode information data is generated by a mode information generator 28 according to the decision. The transmission mode information data thus generated is loaded once in a mode memory 17 of FIG. 2. Then, at the time of transmission, the switch circuits 14 and 13 are first connected to a terminal R side in the drawing. The circuits operate to connect the switch circuit 15 to the first memory group side when E mode but to the second memory group side when C mode according to the transmission mode information loaded in the mode memory 17, and a signal R read by the memory is transmitted through a transmission part 18 together with the mode information data. Then, whenever the signal R has been transmitted, the switch circuits 13, 14 are transferred one after another to G side and B side to transmit the signals G and B through the transmission part 18 likewise.

Meanwhile, according to the prior art transmission system described as above, a mode to transmit is discriminated by the mode discriminating circuit 16 only on a level of the luminance signal or a difference in power, therefore the video signal transmitted according to such transmission system is capable of causing an error in a hue from a band compression operation particularly in the block small in a change of the luminance signal but large in a change of the hue, and since such error may cause unevenness of color or the like, it is difficult to transmit the video signal with a picture quality thoroughly ensured.

Then, in case the video signal transmitted according to such transmission system as described is displayed on a display, since a human visual system characteristic is keen to a change in luminance in a low luminance portion as compared with a high luminance portion, a visual system distortion is intensified in the low luminance block as compared with the high luminance block, and thus an image after transmission seems to be degraded considerably.

Further, the video signal transmitted according to the aforementioned transmission system has a transmission mode discriminated in any case, according to the luminance signal and not to a color information, therefore when displayed on a display, the important portion or human face, for example, on a picture becomes low in resolution, and if so, then the picture quality seems to be considerably degraded.

SUMMARY OF THE INVENTION

It is an object of the invention to provide a color picture information transmission system whereby the aforementioned problem can be solved.

Then, another object of the invention is to provide a color picture information transmission system whereby a degradation of picture quality such as unevenness of color or the like will be suppressed through a simple construction, and a color picture information can be transmitted with the band compressed therefor.

Under such objects, according to the invention, there is provided, in one embodiment thereof, a color picture information transmission system for transmitting a color picture information signal, comprising color component information signal forming means for forming a color component information signal from the color picture information signal, transmission signal forming means for forming a plurality of transmission signals by means of the color component information signal obtained through the color component information signal forming means according to a plurality of transmission modes varying in information transmission density from each other, transmission mode selecting means wherein the color component information signal obtained through the color component information signal forming means is divided into a plurality of groups, a transition of the color component information signal in each group according to the plurality of transmission modes is detected with reference to each color component information signal group, and a transmission mode in each group is selected from among the plurality of transmission modes according to the detection result, and transmission means for outputting and transmitting the transmission signal formed in the transmission signal forming means on one transmission mode of the plurality of transmission modes which is based on the selection result through the transmission mode selecting means.

Then, a further object of the invention is to provide a color picture information transmission system capable of transmitting a color picture information with the band compressed therefor according to a human visual system characteristic through a simple construction.

Under such object, according to the invention, there is provided, in one embodiment thereof, a color picture information transmission system for transmitting a color picture information signal for which a plurality of information signals are multiplexed, comprising transmission signal forming means for forming a plurality of transmission signals by means of the color picture information signal according to a plurality of transmission modes varying in information transmission density from each other, transmission mode selecting means wherein the color picture information signal is divided into a plurality of groups, a transition of at least one information signal in each group according to the plurality of transmission modes is detected with reference to each color picture information signal group, the detection result is compared with a threshold value set on a visual system characteristic, and a transmission mode in each group is selected from among the plurality of transmission modes according to the comparison result, and transmission means for outputting and transmitting the transmission signal formed in the transmission signal forming means on one transmission mode of the plurality of transmission modes which is based on the selection result through the transmission mode selecting means.

Still, another object of the invention is to provide a color picture information transmission system capable of transmitting a color picture information in such manner as will keep a degradation of picture quality visually inconspicuous.

Under such object, according to the invention, there is provided, in one embodiment thereof, a color picture information transmission system for transmitting a color picture information signal for which a plurality of information signals are multiplexed, comprising transmission signal forming means for forming a plurality of transmission signals by means of the color picture information signal according to a plurality of transmission modes varying in information transmission density from each other, transmission mode selecting means wherein the color picture information signal is divided into a plurality of groups, a transition of a first information signal in each group according to the plurality of transmission modes is detected with reference to each color picture information signal group, and a transmission mode selecting means for selecting a transmission mode in each group from among the plurality of transmission modes according to the detection result, control means wherein whether or not a second information signal varying from the first information signal indicates a value set beforehand is discriminated in the color picture information signal, and the transmission mode selecting means is controlled so that the corresponding color picture signal groups assume a predetermined transmission mode in the transmission mode selecting means, and transmission means for outputting and transmitting a transmission signal formed of one transmission mode of the plurality of transmission modes which is based on a selection result of the transmission mode selecting means.

Other objects of the invention than what has been referred to above and features thereof will be made apparent from a detailed description of preferred embodiments of the invention with reference to the accompanying drawings.

BRIEF DESCRIPTION OF THE DRAWINGS

FIG. 10 is a flowchart of a discriminating operation in a chromaticity detection circuit in the color picture information transmission system shown in FIG. 8.

DETAILED DESCRIPTION OF PREFERRED EMBODIMENTS

The invention will now be described with reference to its preferred embodiments.

Figure 5:
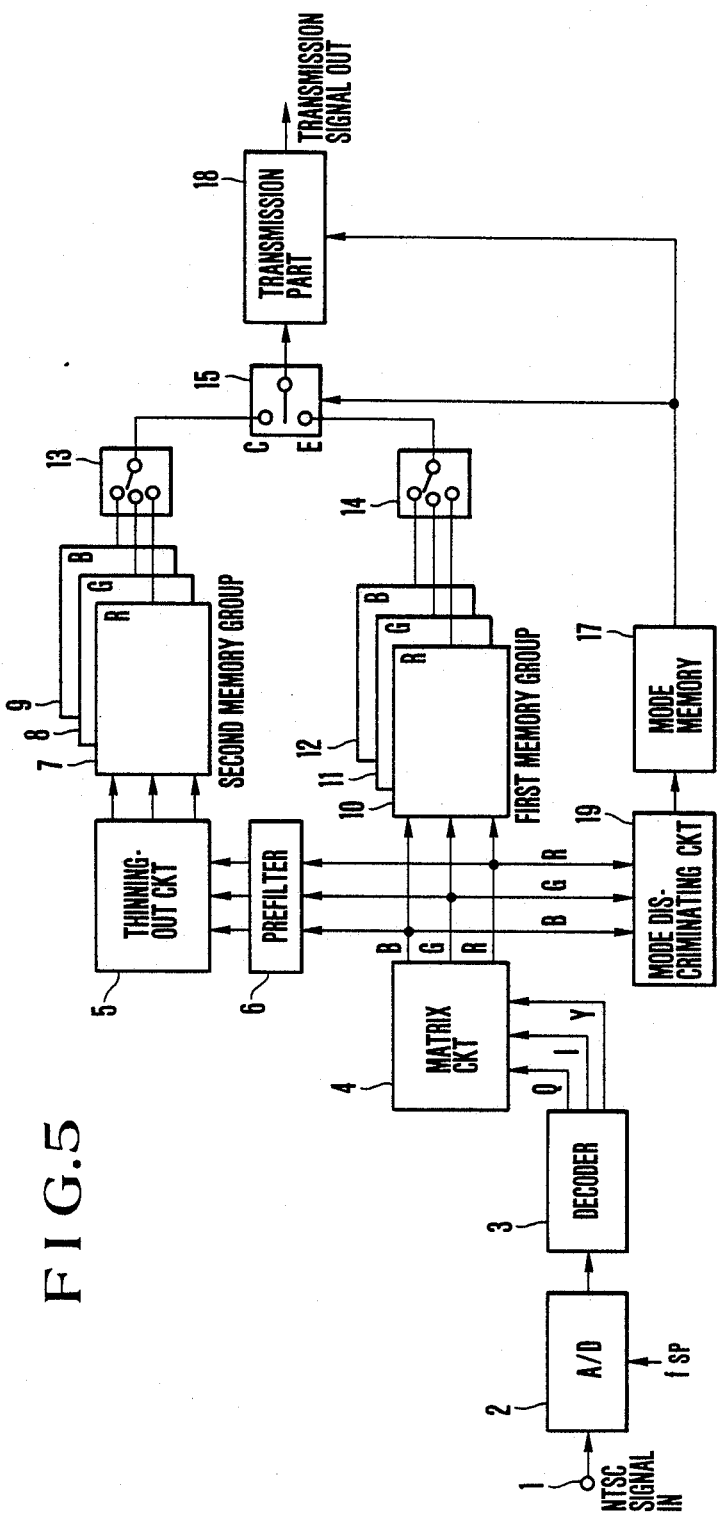
FIG. 5 is a schematic block diagram of a color picture information transmission system given in a first embodiment of the invention.

FIG. 5 is a schematic block diagram of a color picture information transmission system given in one embodiment of the invention. Then, like reference characters represent like parts so functioning in FIG. 2.

Figure 1:
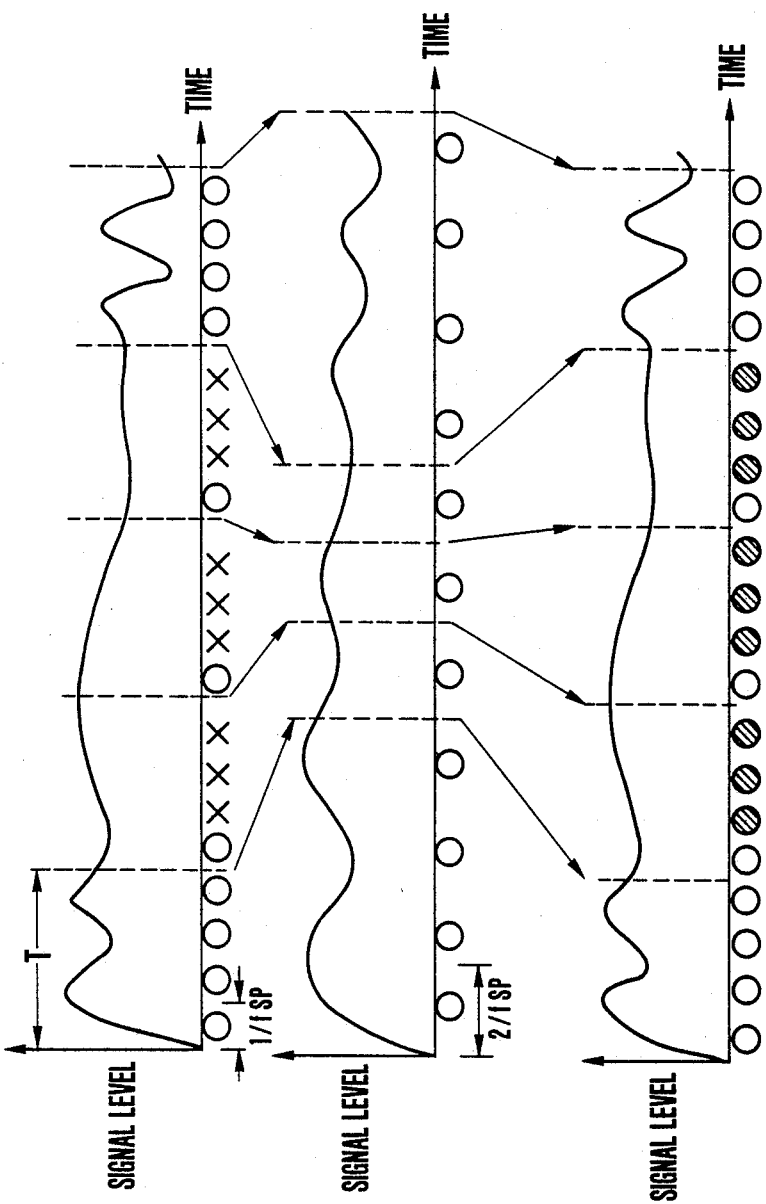
FIG. 1 is a pattern drawing of a principle of variable density sampling system.
Figure 2:
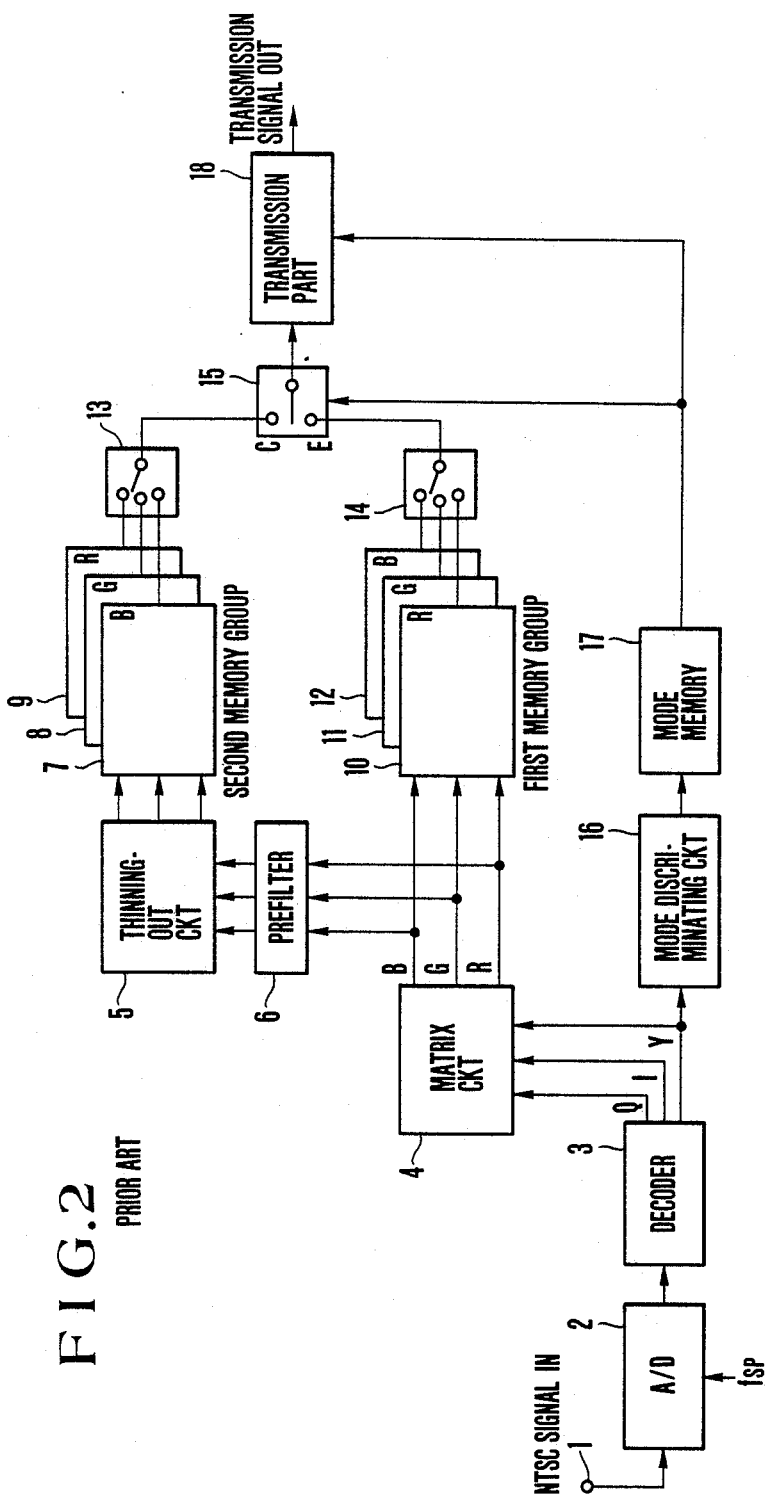
FIG. 2 is a schematic block diagram of a prior art color picture information transmission system.

In FIG. 5, signals Y, I, Q output from a decoder 3 are fed to a matrix circuit 4 as in the case of FIG. 2, and the signals thus inputted are converted into color component signals R, G, B.

Then, the color component signals output from the matrix circuit 4 are fed to R-, G-, B-memories 7, 8, 9 of a second memory group through a prefilter 6 and a thinning-out circuit 5 and also fed directly to R-, G-, B-memories 10, 11, 12 of a first memory group, respectively.

As in the case of FIG. 2, information of each sampling point of R, G, B is divided and stored in R-, G-, B-memories 10, 11, 12 of the first memory group and R-, G-, B-memories 7, 8, 9 of the second memory group.

On the other hand, the color component signals R, G, B are also fed to a mode discriminating circuit 19, and a transmission mode is discriminated by the mode discriminating circuit 19 by means of the color component signals R, G, B.

Figure 6:
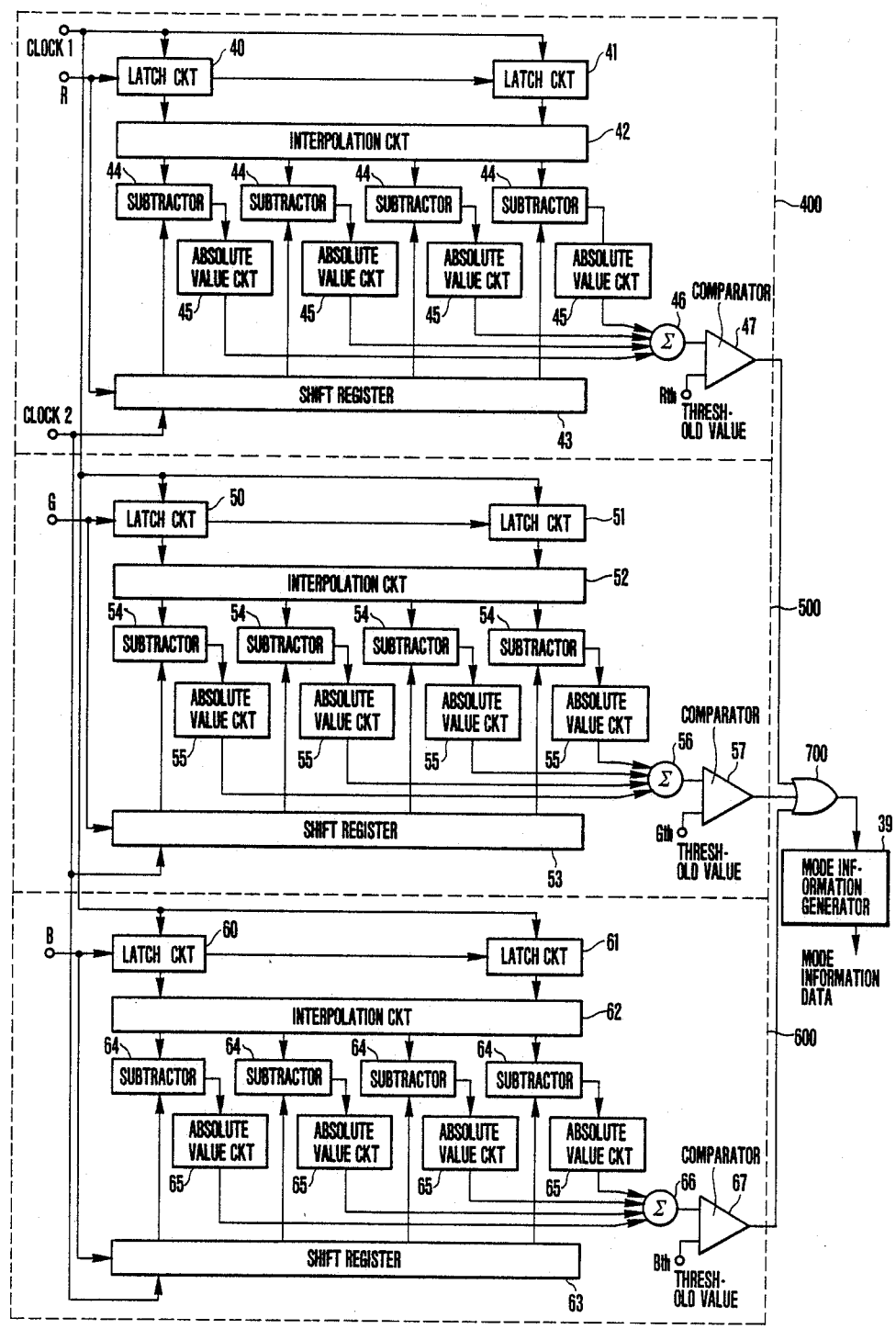
FIG. 6 is a schematic block diagram of a mode discriminating circuit in the color picture information transmission system shown in FIG. 5.

FIG. 6 is a schematic block diagram of the mode discriminating circuit in the color picture information transmission system of FIG. 5. A mode discriminating operation will then be described with reference to FIG. 6.

As shown in FIG. 6, the mode discriminating circuit 19 comprises three separate and independent discriminating circuits 400, 500, 600 having respective input signals R, G and B.

Figure 3:
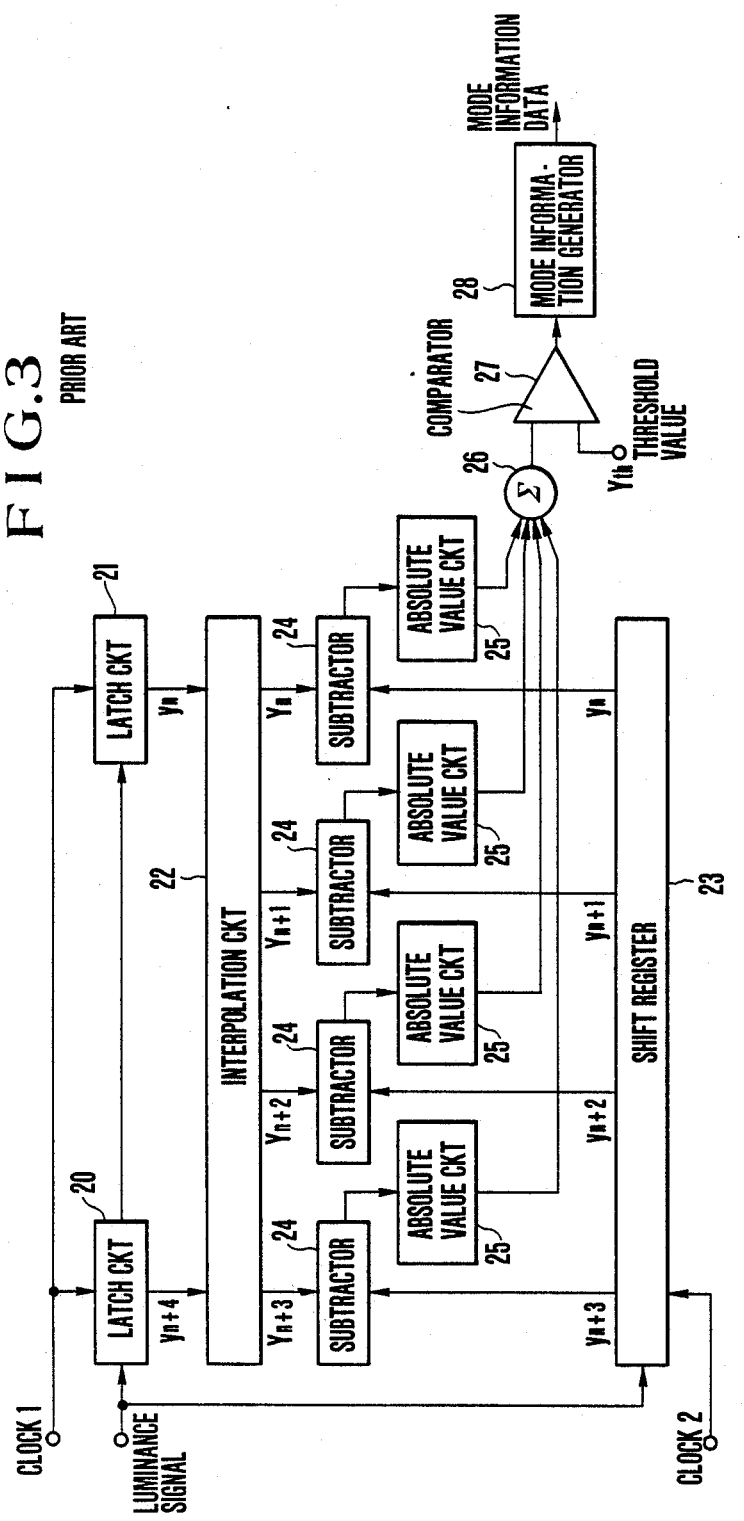
FIG. 3 is a schematic block diagram of a mode discriminating circuit in the color picture information transmission system shown in FIG. 2.
Figure 4:
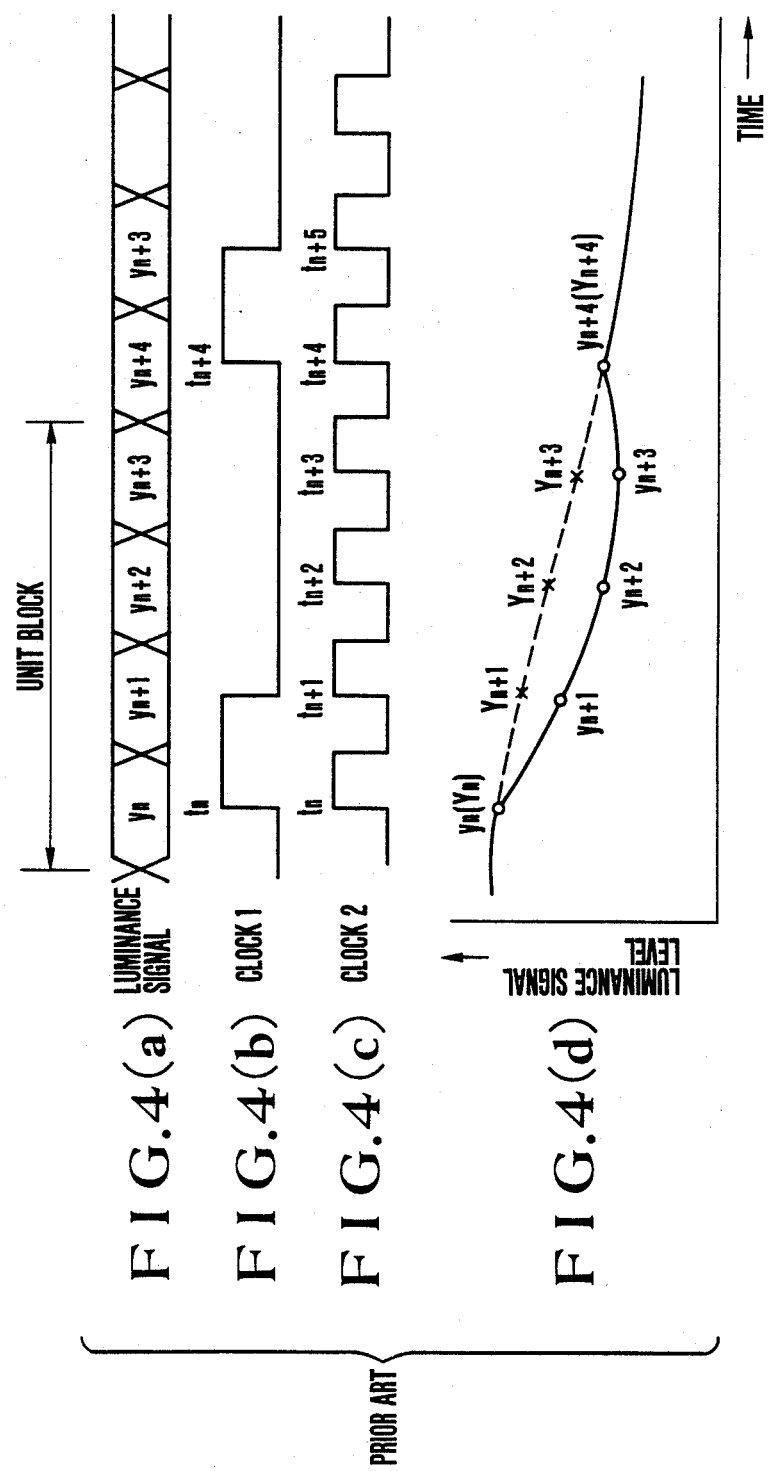
FIGS. 4(a) to 4(d) are performance timing charts of the mode discriminating circuit shown in FIG. 3.

Then, the mode discriminating circuits 400, 500, 600 function equivalently to FIG. 3. That is, the color component signal R inputted to the mode discriminating circuit 400 is fed to latch circuits 40, 41 and a shift register 43, the difference in level between an is interpolation signal interpolated by an interpolation circuit 42 synchronously with clocks 1 and 2 as in the case of FIG. 3 and an original signal is computed at each unit block by a subtractor 44 and an absolute value circuit 45. Further, the summation of the level differences is computed on an adder 46 and fed to a comparator 47.

A threshold value Rth set beforehand is been fed to the comparator 47, and the summation of the level differences between the interpolation signal and the original signal and the threshold value Rth are compared with each other at each unit block by the comparator 47, and where the summation of the level differences is greater and so decided than the threshold value Rth, a mode discriminating signal is output to take a transmission mode (E mode) for transmitting all information of the sampling points in the unit block, but when decided less, another mode discriminating signal is output to take a transmission mode (C mode) for transmitting a part of information of the sampling points in the unit block, and is fed to an OR gate 700.

Then, a discrimination of the transmission mode for other color component signals G, B is carried out in order likewise through the mode discriminating circuits 500, 600, and the mode discriminating signals are fed to the OR gate 700.

The mode discriminating signals for the color component signals R, G, B which are fed to the OR gate 700 are inputted one by one to a mode information generating circuit 39, and a mode information data generated in the mode information generating circuit 39 is stored in a mode memory 17.

Then, transmission switch circuits 13 and 14 are connected each to a terminal R side in the drawing as in the case of FIG. 2, and a switch circuit 15 is connected to the first memory group side for E mode but to the second memory group side for C mode according to the transmission mode information loaded in the mode memory 17, and the signal R read out of the memory is transmitted from a transmission part 18.

Then, when the signal R has been transmitted, the switch circuits 13, 14 are transferred to G side and B side in order, and the signals G and B are transmitted likewise through the transmission part 18.

As described above, the summation of absolute values of the level difference between the original signal and the interpolation signal is detected at every color component signal in the unit block, which is compared with the threshold value set beforehand for discrimination of each mode, and by transmitting according to the discriminated transmission mode information. A band can be compressed, without impairing the quality, for such picture including the block with a luminance signal changing less and a color hue changing sharply, or particularly a picture low in luminance entirely.

Then, the threshold values will be made proportional approximately to an inverse number of the ratio holding in the luminance signal each at every color component, and thus an error of any color component will be shared uniformly with the luminance signal, resolution will not be degraded in a specific hue, and a band can be compressed to conform well to the human visual system characteristic.

While the color component signals are above discussed as R, G, B in the embodiment, a combination of yellow, cyan, magenta and the like may be employed otherwise.

Another embodiment of the invention will be described, next.

Figure 7:
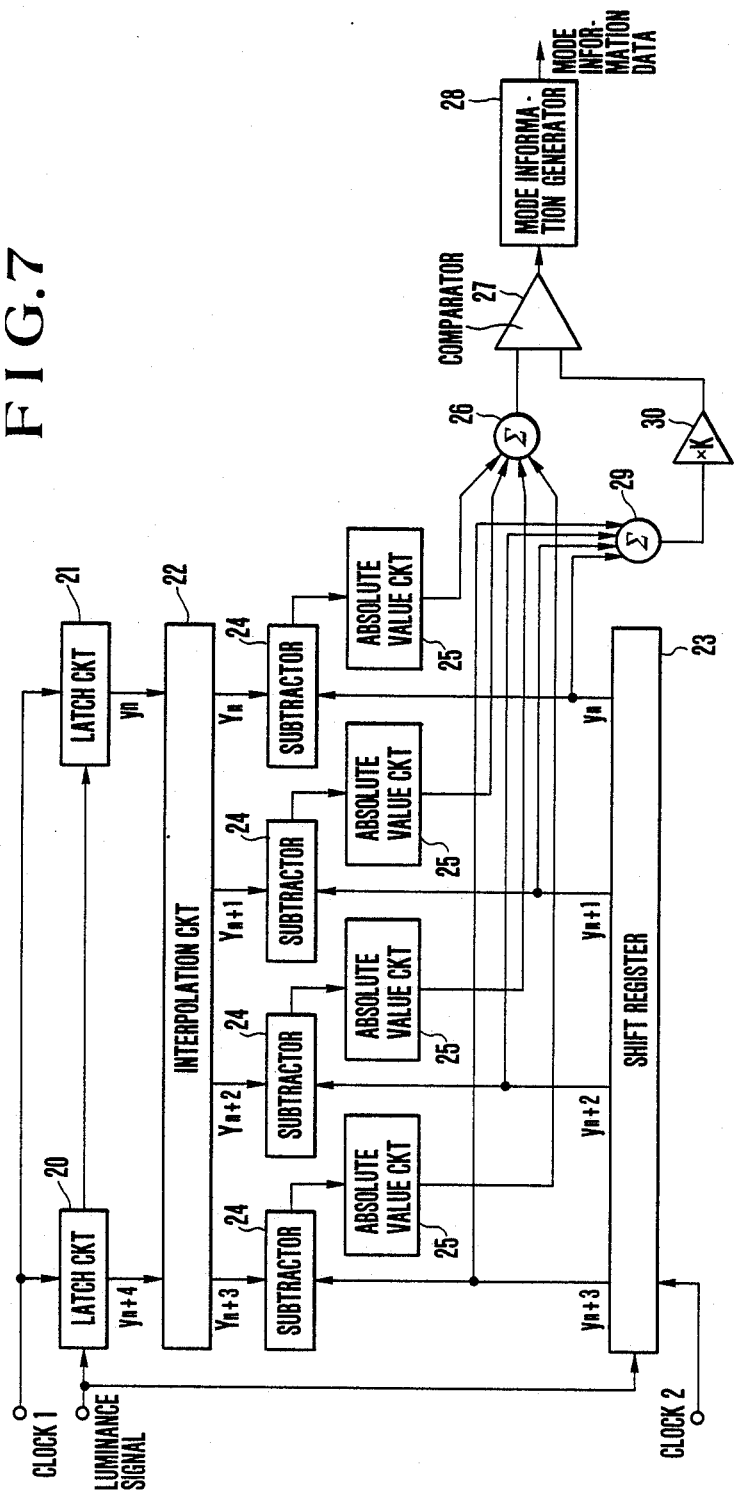
FIG. 7 is a schematic block diagram of a mode discriminating circuit in the color picture information transmission system shown in FIG. 5 which is given in another embodiment of the invention.

FIG. 7 is a schematic block diagram of the mode discriminating circuit in another embodiment of the invention.

As in the case of FIG. 2, the luminance signal separated from the input video signal in a decoder is fed to the mode discriminating circuit shown in FIG. 7.

The luminance signal Y fed as above is fed to latch circuits 20, 21 and a shift register 23, a level difference between an interpolation signal interpolated by an interpolation circuit 22 synchronously with the clocks 1 and 2 as in the case of FIG. 3 and an original signal is computed by a subtractor 24 and an absolute value circuit 25, and the summation of the level differences is computed on an adder 26 and fed to a comparator 27.

On the other hand, outputs $y_n$ to $y_{n+3}$ of the shift register 23 have also been fed to an adder 29, and the summation of the luminance signal levels in the unit block is computed on the adder 29.

Then, a threshold value in the unit block is computed from the summation of the luminance signal levels in the unit block which is computed as above. That is, an output of the adder 29 is multiplied by a constant K set beforehand on a multiplier 30, and the result is fed to the comparator 27 as a threshold value.

Meanwhile, the human visual system characteristic has been taken up for study various ways hitherto, and now, for example, let Y stand for the luminance signal level and $\Delta Y$ stand for the variation at which the human eyes can sense a change in the luminance signal level, then the following relation holds between the two:

$\Delta Y/Y \simeq$ constant

Then, $\Delta Y$ is obtained through selecting properly a value of the constant K multiplied on the multiplier 30, and if the summation of the level differences between interpolation signal and original signal obtained through the adder 26 is decided to be greater than $\Delta Y$, a transmission mode (E mode) for transmitting all information of the sampling points within the unit block is preferred, but if decided to be less than $\Delta Y$, then a transmission mode (C mode) for transmitting a part of information of the sampling points within the unit block is preferred. A transmission information data according to a decision result by the comparator is generated from the mode information generator, and the transmission mode information data thus generated is loaded in the mode memory 17 as shown in FIG. 2.

Then, the transmission mode information data stored in the mode memory 17 is read out, information signals of the sampling points transmitted from the first and second memory groups are read according to the transmission mode information data as in the case of FIG. 2 and then transmitted through the transmission part. The transmission mode information data read out of the mode memory in this case is also transmitted together therewith.

As described above, the threshold value to be used for discrimination of the transmission modes will be changed according to the level of an inputted luminance signal, which is effective in transmitting a video signal with the band compressed therefor in consideration particularly of the human visual system characteristic and also as keeping the quality from being degraded visually even for a picture low in luminance signal level.

Then in the embodiment, an arrangement is such that the mode information is decided on the human visual system characteristic of luminance signals, however, the mode information can be decided otherwise on the visual system characteristic of color signals.

A further embodiment of the invention will be then described below.

Figure 8:
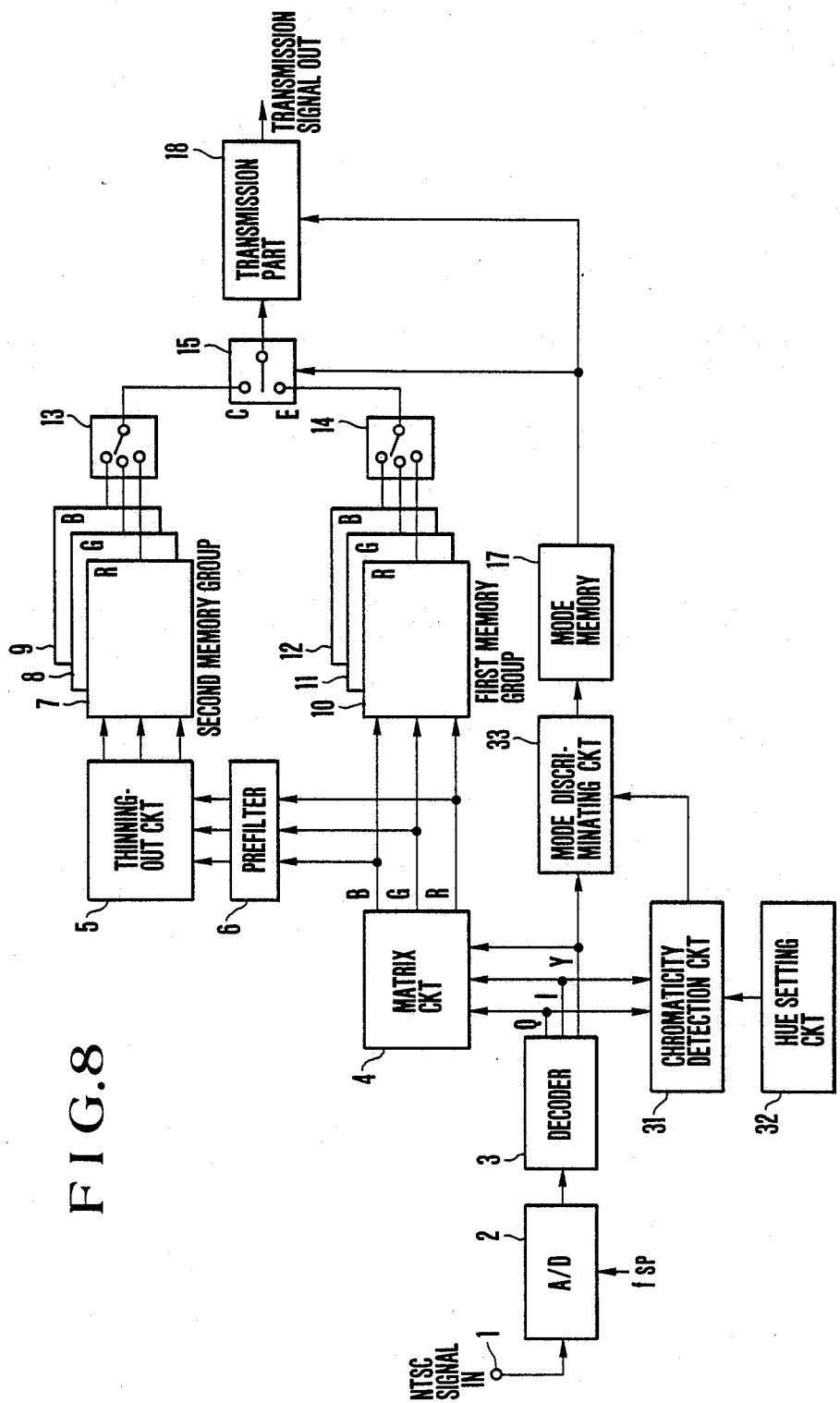
FIG. 8 is a schematic block diagram of a color picture information transmission system given in a further embodiment of the invention.

FIG. 8 is a schematic block diagram of a color picture information transmission system to which the invention is applied, wherein like reference characters represent like parts so functioning in FIG. 2.

In FIG. 8, signals Y, I, Q output from the decoder 3 are fed to the matrix circuit 4 as in the case of FIG. 2, further the signals I, Q are also fed to a chromaticity detection circuit 31, and the signal Y is fed to a mode discriminating circuit 33 as in the case of FIG. 2.

Then in the matrix circuit 4, the signals Y, I, Q are converted into color component signals R, G, B as in the case of FIG. 2, the color component signals are fed to R-, G-, B-memories 7, 8, 9 of the second memory group through the prefilter 6 and the thinning-out circuit 5 and also fed directly to R-, G-, B-memories 10, 11, 12 of the first memory group, respectively, and information of each sampling point of R, G, B is divided and stored in R-, G-, B-memories 10, 11, 12 of the first memory group and R-, G-, B-memories 7, 8, 9 of the second memory group.

On the other hand, in the mode discriminating circuit 33, the luminance signal Y is fed to the latch circuits 20, 21 and the shift register 23 as in the case of FIG. 3, the level difference between the interpolation signal interpolated through the interpolation circuit 22 synchronously with the clocks 1 and 2 and the original signal is computed through the subtractor 24 and the absolute value circuit 25, the summation of the level differences is computed by the adder 26 and fed to the comparator 27.

The threshold value Yth set beforehand has been fed to the comparator 27, and the summation is compared with the threshold value Yth, and when the summation of the level differences is decided to be greater than the threshold value Yth, a mode discriminating signal to take a transmission mode (E mode) for transmitting all information of the sampling points within the unit block is output to a mode information generator 28, but if decided to be less than that, then another mode discriminating signal to take a transmission mode (C mode) for transmitting a part of information of the sampling points within the unit block is output thereto, a mode information data corresponding to the mode discriminating signal is output from the mode information generator 28, and the output mode information data is stored in the memory 17 shown in FIG. 8.

Meanwhile, the mode information data generated from the mode information generator 28 in the embodiment is also controlled by a detection signal generated from the chromaticity detection circuit 31. The following description refers to the control operation.

The signals I, Q have been inputted to the chromaticity detection circuit 31, and whether or not the inputted signals I, Q are present within a domain set arbitrarily by a hue setting circuit 32 is decided by the chromaticity detection circuit 31, and if present within the domain, then the detection signal is output to the mode information generator 28 to control for outputting the E mode information data regardless of a magnitude of level between the sampling points within the block or dispersion of electric power.

Figure 9:
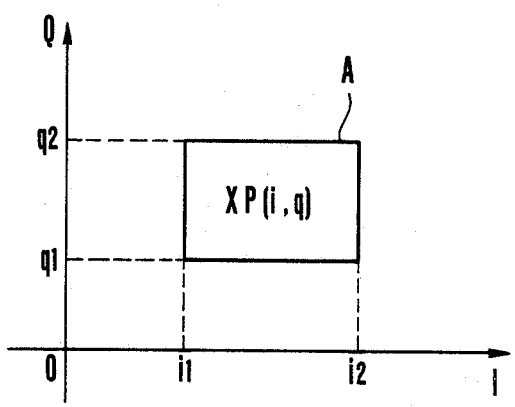
FIG. 9 is a drawing showing a domain set in a hue setting circuit of the color picture information transmission system shown in FIG. 8.

Then, in a coordinate with a level of the signal I on the quadrature axis and the signal Q on the axis of ordinates as shown in FIG. 9, the hue setting circuit 32 has a domain A ($P(i_1-i_2, q_1-q_2)$) set according to color information, and the chromaticity detection circuit 31 has the mode information generator 28 controlled as described above according to a decision on whether or not the input video signal is present within the domain A.

FIG. 10 is a flowchart of a discriminating operation in the chromaticity detection circuit 31.

In FIG. 10, after the domain A is set through the hue setting circuit 32 (STEP 1), one block of the input video signal is watched (STEP 2), and hue coordinates i, q on the axes I, Q of the block are obtained (STEP 3).

Then, if i, q satisfy $i_1 \leq i \leq i_2$, $q_1 \leq q \leq q_2$ respectively (STEPS 4, 5), a mode information data of the watched block is turned forcedly to E mode (STEP 6). When not satisfied, a mode discrimination is carried out by detecting a dispersion of the luminance signal level between the normal sampling points or the electric power (STEP 7).

After the mode discrimination is thus over, the process goes forward to the next block (STEP 8), and if a signal of the unit block for discriminating the transmission mode is inputted, then the process similar to the foregoing is repeated (STEP 9).

The mode information data generated as above and stored in the mode memory 17 is read at the time of transmission, information signals of the sampling points transmitted from the first and second memory groups are read according to the mode information data as in the case of FIG. 2 and then transmitted through the transmission part 18. Further, the transmission mode information data read out of the mode memory 17 in this case is also transmitted together therewith.

Then, the set domain is specified as being one in the embodiment, however, the set domain may be pluralized for to transferring selectively.

Further, the set domain will be set to a hue which is a subject for the input picture information, or a complexion, for example, then a portion working as the subject is transmitted at high density of transmission mode, and thus the picture information can be reproduced without degradation visually on a display.

Still further, levels of the signals I, Q are monitored in the hue detecting circuit, a signal of the level generated most in the block for one picture is detected, and the domain is set adaptively around a coordinate of the signal, which is effective in transmitting the signal without degradation of the picture information visually in any picture.

As described, the set domain is provided to the signals I, Q of the inputted video information signal, and a transmission is effected in E mode forcedly to the block coming within the domain, thereby transmitting the video information signal with the transmission band compressed therefor so as to keep the information signal from being degraded conspicuously at the time of reproduction of the video information signal.

What is claimed is:

1. A color picture information signal transmission system for transmitting a color picture information signal, comprising:
    (A) color component information signal forming means for forming a color component information signal from said color picture information signal;
    (B) transmission signal forming means for forming a plurality of transmission signals by means of the color component information signal obtained through said color component information signal forming means according to a plurality of transmission modes varying in information transmission density from each other;
    (C) transmission mode selecting means wherein the color component information signal obtained through said color component information signal forming means is divided into a plurality of groups, a transition of the color component information signal in each group according to said plurality of transmission modes is detected with reference to each color component information signal group, and a transmission mode in each group is selected from among said plurality of transmission modes according to the detection result; and
    (D) transmission means for outputting and transmitting a transmission signal formed by said transmission signal forming means according to one kind of transmission mode out of said plurality of transmission modes which is based on the selection result of said transmission mode selecting means.

2. The color picture information signal transmission system according to claim 1, wherein said transmission signal forming means includes at least one thinning-out circuit for thinning said color component information signal.

3. The color picture information signal transmission system according to claim 1, wherein said transmission signal forming means includes a plurality of storage circuits for respective storage of said plurality of transmission signals, and wherein said transmission means is arranged to output a transmission signal stored in one storage circuit of said plurality of storage circuits which meets the selection result of said transmission mode selecting means.

4. The color picture information signal transmission system according to claim 1, wherein said transmission mode selecting means includes:
    (a) latch means for inputting said color component information signal by the quantity corresponding to said group and thinning it in the ratio corresponding to said plurality of transmission modes;

(b) an interpolation circuit for interpolation by means of the color component information signal thinned out by said latch means; and (c) a transmission mode indicating signal generating circuit for comparing to computation the color component information signal interpolated by said interpolation circuit and the color component information signal not yet thinned out by said thinning-out circuit, and generating a transmission mode indicating signal for indicating a transmission mode of said plurality of transmission modes which meets the computation result.

5. The color picture information signal transmission system according to claim 4, wherein said transmission means is arranged to output a transmission signal through said transmission signal forming means according to the transmission mode indicating signal generated from said transmission mode indicating signal generating circuit, and to transmit said transmission signal together with said transmission mode indicating signal.

6. A color picture information signal transmission system for transmitting a color picture information signal including at least a luminance information signal and a chrominance information signal, comprising:

(A) a matrix circuit for converting said color picture information signal into a color component information signal;

(B) transmission signal forming means for forming a plurality of transmission signals by means of the color component information signal obtained through said matrix circuit according to a plurality of transmission modes varying in information transmission density from each other;

(C) transmission mode selecting means, wherein the color component information signal obtained through said matrix circuit is divided into a plurality of groups, a transition of the color component information signal in each group according to said plurality of transmission modes is detected with reference to each color component information signal group, and a transmission mode in each group is selected from among said plurality of transmission modes according to the detection result; and (D) transmission means for outputting and transmitting a transmission signal formed in said transmission signal forming means according to one kind of transmission mode of said plurality of transmission modes which is based on the selection result of said transmission mode selecting means.

7. The color picture information signal transmission system according to claim 6, wherein said matrix circuit includes a converter for converting the luminance information signal and the chrominance information signal in said color picture information signal in said color picture information signal into a plurality of color signals.

8. The color picture information signal transmission system according to claim 7, wherein said transmission signal forming means includes:

(a) a thinning-out circuit for thinning out the plurality of color signals obtained through said converter; and (b) a storage circuit for storing the plurality of color signals thinned out through said thinning-out circuit.

9. The color picture information signal transmission system according to claim 8, wherein said plurality of storage circuits includes memories in the number corresponding to the kinds of said color signals.

10. The color picture information signal transmission system according to claim 8, wherein said transmission means includes an output transfer circuit for selecting said plurality of storage circuits according to the selection result of said transmission mode selecting means, and outputting a plurality of color signals stored in the selected storage circuit.

11. The color picture information signal transmission system according to claim 7, wherein said transmission mode selecting means includes:

(a) latch means for inputting said plurality of color signals by the quantity corresponding to said groups, and thinning out in the ratio corresponding to said plurality of transmission modes;

(b) a plurality in interpolation circuits for interpolation at every color signal of a kind by means of the plurality of color signals interpolated through said latch means; for (c) a plurality of relative operation circuits comparing to computation the plurality of color signals, interpolated through said plurality of interpolation circuits with the plurality of color signals not yet thinned out through said latch means at every color signal of a kind; and (d) a transmission mode indicating signal generating circuit for generating a transmission mode indicating signal for indicating a transmission mode of said plurality of transmission modes which corresponds to the relative operation result in said plurality of relative operation circuits.

12. The color picture information signal transmission system according to claim 11, wherein said transmission means is arranged to output a transmission signal from said transmission signal forming means according to the transmission mode indicating signal generated through said transmission mode indicating signal generating circuit, and to transmit said transmission signal together with said transmission mode indicating signal.

13. A color picture information signal transmission system for transmitting a color picture information signal for which a plurality of information signals are multiplexed, comprising:

(A) transmission signal forming means for forming a plurality of transmission signals by means of said color picture information signal according to a plurality of transmission modes varying in information transmission density from each other;

(B) transmission mode selecting means, wherein said color picture information signal is divided into a plurality of groups, a transition of at least one kind of information signal in each group according to said plurality of transmission modes is detected with reference to each color picture information signal group, the detection result is compared with a threshold value set according to a system visual characteristic, and a transmission mode in each group is selected from among said plurality of transmission modes according to the comparison result; and (C) transmission means for outputting and transmitting a transmission signal formed on one kind of transmission mode of the plurality of transmission mode which is based on the selection result of said transmission mode selecting means in said transmission signal forming means.

14. The color picture information signal transmission system according to claim 13, wherein said transmission signal forming means includes latch means for thinning out said color picture information signal.

15. The color picture information signal transmission system according to claim 13, wherein said transmission signal forming means includes a plurality of storage circuits for respective storage of said plurality of transmission signals, and wherein said transmission means is arranged to output a transmission signal stored in one storage circuit of said plurality of storage circuits which meets the selection result of said transmission mode selecting means.

16. The color picture information signal transmission system according to claim 13, wherein said transmission mode selecting means includes:
(a) latch means for inputting said color picture information signal by the quantity corresponding to said groups, and thinning out in the ratio corresponding to said plurality of transmission modes;
(b) an interpolation circuit for interpolation by means of the color picture signal thinned out in said latch means;
(c) substracting means for computing the color picture information signal interpolated through said interpolation circuit and the color picture information signal not yet thinned out by said latch means, and outputting an operation signal according to the computation result;
(d) a threshold value signal generating circuit for generating a threshold value signal based on a visual characteristic by means of the color picture information signal not yet thinned out by said latch means; and
(e) a transmission mode indicating signal generating circuit for comparing to computation the operation signal output from said substracting means and the threshold value signal generated from said threshold value signal generating circuit, and generating a transmission mode indicating signal for indicating a transmission mode of said plurality of transmission mode which meets the operation result.

17. The color picture information signal transmission system according to claim 16, wherein said transmission means is arranged to output a transmission signal from said transmission signal forming means according to the transmission mode indicating signal generated from said transmission mode indicating signal generating circuit, and to transmit said transmission signal together with said transmission mode indicating signal.

18. A picture information signal transmission system for transmitting a picture information signal including at least a luminance information signal, comprising:
(A) transmission signal forming means for forming a plurality of transmission signals by means of said picture information signal according to a plurality of transmission modes varying in information transmission density from each other;
(B) transmission mode selecting means wherein said picture information signal is divided into a plurality of groups, a transition of the luminance information signal in each group according to said plurality of transmission modes is detected with reference to each picture information signal group, the detection result is compared with a threshold value set on a visual characteristic, and a transmission mode in each group is selected from among said plurality of transmission modes according to the comparison result; and
(C) transmission means for outputting and transmitting a transmission signal formed on one kind of transmission mode of said plurality of transmission modes in said transmission signal forming means according to the selection result of said transmission mode selecting means.

19. The picture information signal transmission system according to claim 18, wherein said transmission signal forming means includes latch means for thinning out said picture information signal.

20. The picture information signal transmission system according to claim 18, wherein said transmission signal forming means includes a plurality of storage circuits for respective storage of said plurality of transmission signals, and wherein said transmission means is arranged to output a transmission signal stored in one storage circuit of said plurality of storage circuits which meets the selection result of said transmission mode selecting means.

21. The picture information signal transmission system according to claim 18, wherein said transmission signal forming means includes:
(a) a matrix circuit for converting said picture information signal into a plurality of color signals;
(b) a thinning-out circuit for thinning out the plurality of color signals obtained through said matrix circuit; and
(c) a storage circuit for storing the plurality of color signals thinned out through said matrix circuit.

22. The picture information signal transmission system according to claim 21, wherein said plurality of storage circuits include memories in the number corresponding to the kind of said color signals.

23. The picture information signal transmission system according to claim 21, wherein said transmission means includes an output transfer circuit for selecting said plurality of storage circuits according to the selection result of said transmission mode selecting means, and outputting the plurality of color signals stored in the selected storage circuit.

24. The picture information signal transmission system according to claim 18, wherein said transmission mode selecting means includes:
(a) latch means for inputting the luminance information signal out of said picture information signal by the quantity corresponding to said groups, and thinning out in the ratio corresponding to said plurality of transmission modes;
(b) an interpolation circuit for interpolation by means of the luminance information signal thinned out through said latch means;
(c) an arithmetic circuit for computing the luminance information signal interpolated through said interpolation circuit and the luminance information signal not yet thinned out by said latch means and outputting an operation signal according to the computation result;
(d) a threshold value generating circuit for generating a threshold value signal based on a visual system characteristic by means of the luminance information signal not yet thinned out by said latch means; and
(e) a transmission mode indicating signal generating circuit for comparing to computation the operation signal output from said arithmetic circuit and the threshold value signal generated from said threshold value signal generating circuit, and generating a transmission mode indicating signal for indicating a transmission mode of said plurality of transmission modes which meets the computation result.

25. The picture information signal transmission system according to claim 24, wherein said transmission means is arranged to output a transmission signal through said transmission signal forming means according to the transmission mode indicating signal generated from said transmission mode indicating signal generating circuit, and to transmit said transmission signal together with said transmission mode indicating signal.

26. The picture information signal transmission system according to claim 24, wherein said threshold value signal generating circuit includes an addition circuit for adding a level of the luminance information signal not yet thinned out by said thinning-out circuit by the quantity corresponding to said groups, and a coefficient multiplication circuit for multiplying the addition result in said addition circuit by a coefficient set beforehand.

27. A color picture information signal transmission system for transmitting a color picture information signal for which a plurality of information signals are multiplexed, comprising:
(A) transmission signal forming means for forming a plurality of transmission signals by means of said color picture information signal according to a plurality of transmission modes varying in information transmission density from each other;
(B) transmission mode selecting means arranged to divide said color picture information signal into a plurality of signal groups, detect a state of change of the signal after transmission according to each of said plurality of transmission modes, with regard to a first information signal included in each of said divided signal groups, and then select the transmission mode of each of the signal groups from said plurality of transmission modes, depending upon the state of change of said signal;
(C) control means for controlling said transmission mode selecting means, said control means being arranged to compare a second information signal different in kind from said first information signal included in each of said signal group with a preset value, effect discrimination as to whether or not said second information signal included in each of the signal groups indicates said preset value and then select a predetermined transmission mode corresponding to a result of the discrimination as the transmission mode of each of the signal groups; and
(D) transmission means for outputting and transmitting a transmission signal formed on one kind of transmission mode of said plurality of transmission modes in said transmission signal forming means which is based on the selection result of said transmission mode selecting means.

28. The color picture information signal transmission system according to claim 27, wherein said transmission signal forming means includes latch means for thinning out said color picture information signal.

29. The color picture information signal transmission system according to claim 27, wherein said transmission signal forming means includes a plurality of storage circuits for respective storage of said plurality of transmission signals, and wherein said transmission means is arranged to output a transmission stored in one storage circuit of said plurality of storage signal circuits which meets the selection result of said transmission mode selecting means.

30. The color picture information signal transmission system according to claim 27, wherein said transmission mode selecting means includes:
(a) latch means for inputting said first information signal divided from said color picture information signal by the quantity corresponding to said groups, and thinning out in the ratio corresponding to said plurality of transmission modes;
(b) an interpolation circuit for interpolation by means of the first information signal thinned out by said latch means; and
(c) a transmission mode indicating signal generating circuit for comparing to computation the first information signal interpolated through said interpolation circuit and the first information signal not yet thinned out through the latch means, and generating a transmission mode indicating signal for indicating a transmission mode of said plurality of transmission modes which meets the computation result.

31. The color picture information signal transmission system according to claim 30, wherein said control means includes:
(a) a reference information signal generating circuit for generating a reference information signal corresponding to a reference value set beforehand; and
(b) a detection circuit for inputting said second information signal divided from said color picture information signal by the quantity corresponding to said groups, comparing with the reference information signal generated from said reference information signal generating circuit, generating a detection signal when a value indicated by said reference information signal corresponds to a value indicated by said second information signal, and feeding the detection signal to said transmission mode indicating signal generating circuit.

32. The color picture information signal transmission system according to claim 31, wherein said transmission mode indicating signal generating circuit is arranged to generate a transmission mode indicating signal for indicating the highest transmission density transmission mode regardless of said computation result to the group to which the detection signal generated by said detection circuit is fed.

33. The color picture information signal transmission system according to claim 30, wherein said transmission means is arranged to output a transmission signal through said transmission signal forming means according to the transmission mode indicating signal generated from said transmission mode indicating signal generating circuit, and to transmit said transmission signal together with said transmission mode indicating signal.

34. A color picture information signal transmission system for transmitting a color picture information signal including at least a luminance information signal and a chrominance information signal, comprising:
(A) matrix circuit for converting said color picture information signal into a color component information signal;
(B) transmission signal forming means for forming a plurality of transmission signals by means of the color component information signal obtained through said matrix circuit according to a plurality of transmission modes varying in information transmission modes varying in information transmission density from each other;

(C) transmission mode selecting means wherein said color picture information signal is divided into a plurality of groups, a transition of the luminance information signal in each group according to said plurality of transmission modes is detected with reference to each color picture information signal group, and a transmission mode in each group is selected from among said plurality of transmission modes according to the detection result;

(D) control means wherein whether or not the chrominance information signal indicates a value set beforehand is discriminated in said color picture information signal, and said transmission mode selecting means is controlled so as to turn said corresponding color picture information signal groups to a predetermined transmission modes in said transmission mode selecting means according to the discrimination result; and (E) transmission means for outputting and transmitting a transmission signal formed in said transmission signal forming means on one kind of transmission modes which is based on the selection result of said transmission mode selecting means.

35. The color picture information signal transmission system according to claim 34, wherein said transmission signal forming means includes latch means for thinning out said color picture information signal.

36. The color picture information signal transmission system according to claim 34, wherein said transmission signal forming means includes a plurality of storage circuits for respective storage of said plurality of transmission signals, and wherein said transmission means is arranged to output a transmission signal stored in one storage circuit of said plurality of storage circuits which meets the selection result of said transmission mode selecting means.

37. The color picture information signal transmission system according to claim 34, wherein said matrix circuit includes a conversion circuit for converting the luminance information signal and the chrominance information signal in said color picture information signal into a plurality of color signals.

38. The color picture information signal transmission system according to claim 37, wherein said transmission signal forming means includes:

(a) a latch circuit for thinning out the plurality of color signals obtained through said conversion circuit according to said plurality of transmission modes, each; and (b) a plurality of storage circuits for respective storage of the plurality of color signals thinned out by said latch circuit.

39. The color picture information signal transmission system according to claim 38, wherein said plurality of storage circuits include memories in the number corresponding to the kind of said color signals.

40. The color picture information signal transmission system according to claim 38, wherein said transmission means includes an output transfer circuit for selecting said plurality of storage circuits according to the selection result of said transmission mode selecting means, and outputting the plurality of color signals stored in the selected storage circuit.

41. The color picture information signal transmission system according to claim 38, wherein said transmission mode selecting means includes:

(a) latch means for said inputting the luminance information signal divided from color picture information signal by the quantity corresponding to said groups, and thinning out in the ratio corresponding to said plurality of transmission modes;

(b) an interpolation circuit for interpolation by means of the luminance information signal thinned out in said latch means; and (c) a transmission mode indicating signal generating circuit for comparing to computation the luminance information signal interpolated by said interpolation circuit and the luminance information signal not yet thinned out by said latch means, and generating a transmission mode indicating signal for indicating a transmission mode of said plurality of transmission modes which meets the computation result.

42. The color picture information signal transmission system according to claim 41, wherein said control means includes:

(a) a reference information signal generating circuit for generating a reference information signal corresponding to a reference value set beforehand; and (b) a detection circuit for inputting said color information signal divided from said color picture information signal by the quantity corresponding to said groups, comparing with the reference information signal generated from said reference information signal generating circuit, generating a detection signal when a value indicated by said color information signal corresponds to a value indicated by said reference information signal, and feeding the detection signal to said transmission mode indicating signal generating circuit.

43. The color picture information signal transmission system according to claim 42, wherein said transmission mode indicating signal generating circuit is arranged to generate a transmission mode indicating signal for indicating the highest transmission density transmission mode to the group to which the detection signal generated by said detection circuit is fed regardless of said computation result.

44. The color picture information signal transmission system according to claim 41, wherein said transmission means is arranged to output the transmission signal through said transmission signal forming means according to the transmission mode indicating signal generated from said transmission mode indicating signal generating circuit, and to transmit said transmission signal together with said transmission mode indicating signal.

* * * * *

UNITED STATES PATENT AND TRADEMARK OFFICE
CERTIFICATE OF CORRECTION

PATENT NO. : 4,802,003
DATED : January 31, 1989
INVENTOR(S) : Masahiro Takei and Tadashi Takayama It is certified that error appears in the above-identified patent and that said Letters Patent is hereby corrected as shown below: On the title page

```
Item [30], delete "61-044559" and insert -- 61-044563 --.
Col. 1, line 29, change "C" to -- O --.
Col. 6, line 31, delete "is".
Col. 6, line 32, after "signal" insert -- is --.
Col. 6, line 38, delete "been".
Col. 8, line 25, change "degrated" to -- degraded --.
Col. 9, line 64, delete "to".
Col. 12, line 19, change "in" to -- of --.
Col. 12, line 22, delete "for".
Col. 15, line 45, change "group" to -- groups --.
Col. 17, line 18, change "modes" to -- mode --.
Col. 17, line 24, change "modes" to -- mode --.
Col. 18, line 10, after "from" insert -- said --.
```

Signed and Sealed this

Fourth Day of July, 1989

Attest:

DONALD J. QUIGG

*Attesting Officer*   Commissioner of Patents and Trademarks